United States Patent [19]

Munday et al.

[11] 4,185,079

[45] Jan. 22, 1980

[54] REMOVAL OF PHOSPHINE CONTAMINANT FROM CARBON MONOXIDE GAS MIXTURES

[75] Inventors: Theodore F. Munday, Kendall Park; David Goldstein, East Brunswick; John Walden, Hightstown, all of N.J.

[73] Assignee: FMC Corporation, Philadelphia, Pa.

[21] Appl. No.: 913,785

[22] Filed: Jun. 8, 1978

[51] Int. Cl.$^2$ ............... B01D 53/34; C01B 25/12
[52] U.S. Cl. ................... 423/210; 423/304; 423/317; 423/323; 423/415 A
[58] Field of Search ............ 423/240, 317, 322, 323, 423/304, 299, 210, 415, 415 A

[56] References Cited

U.S. PATENT DOCUMENTS

| | | | |
|---|---|---|---|
| 1,249,392 | 12/1917 | Hechenbleihner | 423/304 |
| 1,325,145 | 12/1919 | Davis | 423/304 |
| 1,463,959 | 8/1923 | Klugh | 423/304 |
| 1,492,713 | 5/1924 | Klugh | 423/304 |
| 1,586,115 | 5/1926 | Piston et al. | 423/304 |
| 1,756,429 | 4/1930 | Larsson | 423/304 |
| 2,107,857 | 2/1938 | Emmett | 423/304 |
| 2,374,188 | 4/1945 | Frear | 423/304 |
| 3,077,382 | 2/1963 | Klein et al. | 423/304 |
| 3,241,917 | 3/1966 | Lapple | 423/304 |
| 3,615,194 | 10/1971 | Reed et al. | 423/304 |
| 3,652,211 | 3/1972 | Mezey et al. | 423/304 |
| 3,652,213 | 3/1972 | Kraus et al. | 423/304 |
| 3,679,560 | 7/1972 | Mezey | 204/157.15 |

FOREIGN PATENT DOCUMENTS 26016 1/1931 Australia ................ 423/317

OTHER PUBLICATIONS

Melville, et al., "The Oxidation of Phosphine in Presence of Tungsten and Molybdenum", J. Chem. Soc., 1934, pp. 264–265, 270–272.
Stripling, "Development of Processes and Equipment for Production of Phosphoric Acid", Tennessee Valley Authority Chemical Engineering Report, No. 2, Wilson Dam, Alabama, 1948, pp. 88–99, 142.
Van Wazer, "Phosphorus and its Compounds", Interscience Publishers, Inc., New York, vol. I, 1958, pp. 180–193.
Frear, et al., "Preferential Oxidation of Phosphorus in Presence of Carbon Monoxide", Ind. Eng. Chem., vol. 36, Oct. 1944, pp. 927–933.
Burt, et al., "Removal of Phosphorus and its Compounds from By-Product Carbon Monoxide Gas from the Phosphorus Furnace", TVA Report 580, Wilson Dam, Alabama, 1945, pp. 3–7.

*Primary Examiner*—Earl C. Thomas
*Attorney, Agent, or Firm*—C. Egolf

[57] ABSTRACT

A method for removing small concentrations of phosphine contained in a carbon monoxide gas mixture by preferentially oxidizing the phosphine, in which the phosphine is oxidized with air at a temperature of from 500° C. to 800° C. to form phosphorus pentoxide, which is recovered from the gas mixture preferably as phosphoric acid.

11 Claims, 1 Drawing Figure

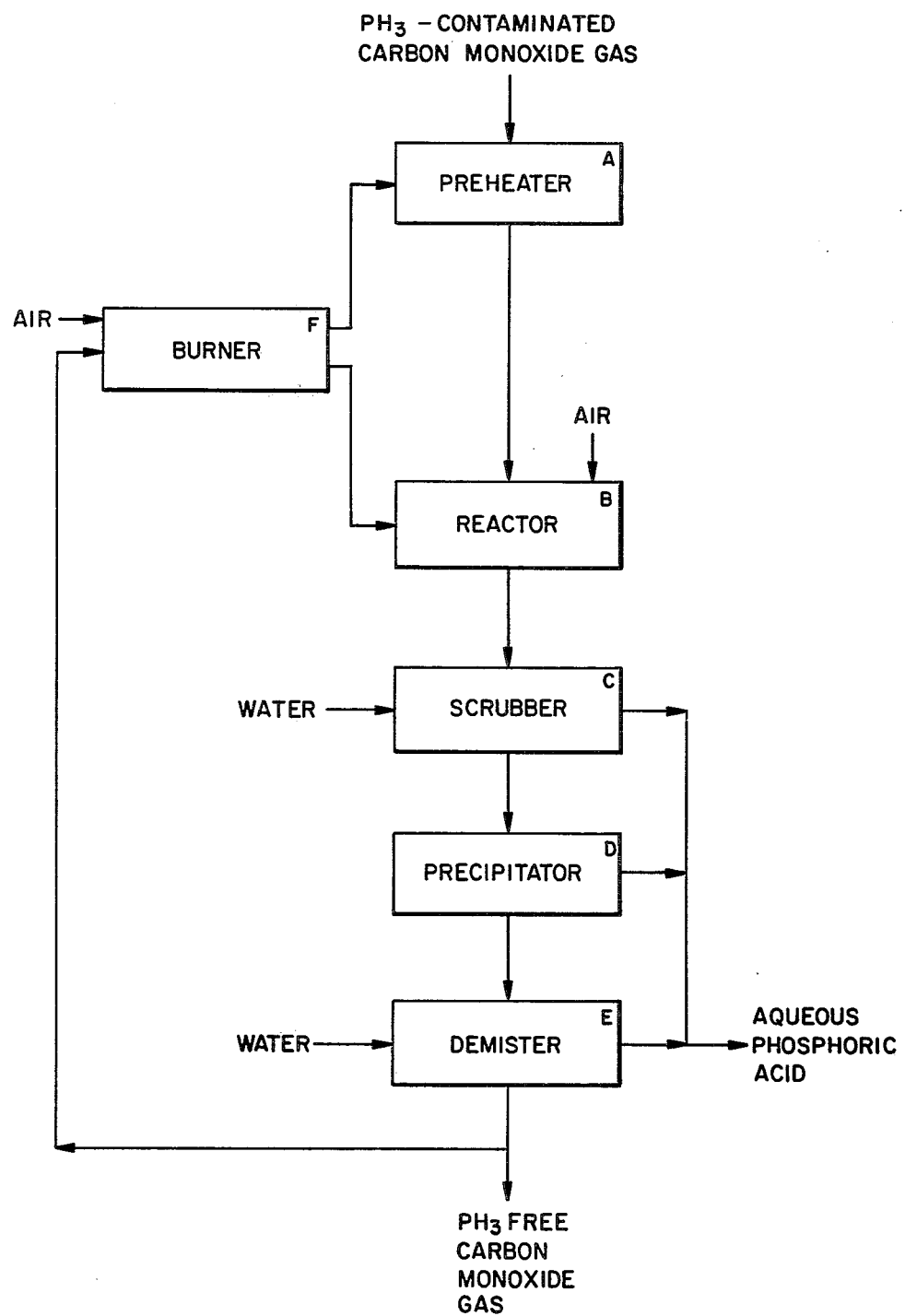

REMOVAL OF PHOSPHINE CONTAMINANT FROM CARBON MONOXIDE GAS MIXTURES

BACKGROUND OF THE INVENTION

1. Field of the Invention

This invention relates to a method for removing phosphine from a gas stream. More particularly, small amounts of phosphine in a carbon monoxide gas stream are oxidized to phosphorus pentoxide, which may be recovered from the gas stream as phosphoric acid.

2. Description of the Prior Art

In the production of elemental phosphorus by the reduction of phosphate ore in an electric furnace, the phosphorus-containing gases removed from the furnace are first passed through an electrostatic precipitator to remove particulate impurities and then cooled to condense the phosphorus vapor. The phosphorus-free furnace gas remaining after such treatment typically contains 90–92% by volume carbon monoxide along with small amounts of nitrogen, hydrogen, oxygen, carbon dioxide, water and phosphine ($PH_3$), the latter being present in a concentration of less than 1%.

Since this carbon monoxide furnace gas has value as a fuel, a simple, low-cost method for removing the small amounts of phosphine from the furnace gas is desirable. Such a method would eliminate the possible formation (and unwanted deposition), when the gas is burned, of reaction products like red phosphorus, metaphosphoric acid, or meta- and orthophosphates and would thus enhance the usefulness of the carbon monoxide furnace gas as a fuel source.

Phosphine is known to react chemically with oxygen to form a variety of reaction products; see Van Wazer, *Phosphorus and Its Compounds*, Interscience Publishers Inc., New York, 1958 at pp. 191–192. The oxidization of elemental phosphorus ($P_4$) present in carbon monoxide gas is taught by Frear in U.S. Pat. No. 2,374,188. However, methods for selectively oxidizing phosphine in carbon monoxide gas have not previously been reported in the literature.

BRIEF SUMMARY OF THE INVENTION

In accordance with the present invention, small concentrations of phosphine are removed from a carbon monoxide gas mixture by preferentially oxidizing the phosphine in the carbon monoxide gas mixture. The phosphine is present in concentrations of less than 1% by volume in a gas mixture containing at least 85% by volume carbon monoxide. The phosphine is removed from the carbon monoxide gas mixture by preheating the gas mixture to a temperature of about 500° C.; introducing an amount of oxygen into the gas mixture sufficient to oxidize the phosphine to phosphorus pentoxide; maintaining the gas mixture at a temperature of from about 500° C. to about 800° C. for a period of time sufficient to react the phosphine to phosphorus pentoxide; and recovering the entrained phosphorus pentoxide reaction product from the gas mixture.

In the preferred method, twice the stoichiometric amount of oxygen, as air, is introduced into the gas mixture, and the gas mixture is maintained at a reaction temperature of from 500° C. to 600° C. for a period of time up to 30 seconds. The phosphorus pentoxide reaction product entrained in the carbon monoxide gas mixture is preferably recovered as phosphoric acid by scrubbing the gas mixture with water or dilute phosphoric acid.

BRIEF DESCRIPTION OF THE DRAWING

The FIGURE illustrates a block flow diagram of a preferred embodiment of this invention.

DETAILED DESCRIPTION

The method of this invention is directed to the removal of contaminating amounts of phosphine from carbon monoxide gas mixtures, such as the off-gas generated in the electric furnace production of elemental phosphorus. These furnace gas mixtures typically contain between 85 to 95% by volume carbon monoxide, most usually 90 to 92% CO (after removal of most particulate solids and condensation of the elemental phosphorus in the furnace gas).

Phosphine, a gaseous contaminant formed in the reducing atmosphere of the furnace, is present in the furnace gas in amounts up to 1%, usually not more than 0.1–0.3%. Other gases typically present in the furnace gas mixture (after condensation of the elemental phosphorus) in small amounts are nitrogen, hydrogen, oxygen, carbon dioxide and water. A representative furnace gas composition (water-free basis) is 90 to 92% CO, 0.1–0.3% $PH_3$, 1–3% $N_2$, and 1–4% $H_2$, 0–0.1% $O_2$ and 0–1% $CO_2$. After condensation of the elemental phosphorus, the furnace gas is normally saturated with water, which typically is 2.7% of the gas composition.

Deviations in the carbon monoxide gas mixture from these representative concentrations of trace gases will not appreciably affect the method of this invention.

In the method of this invention, the phosphine-containing carbon monoxide gas mixture is treated with oxygen so as to react only the phosphine to phosphorus pentoxide, without substantial oxidation of the carbon monoxide to carbon dioxide. The oxygen is preferably supplied as air, the amount of air being sufficient to provide the oxygen concentration required for reaction of the phosphine.

The diluent effect of the nitrogen in the air added to the carbon monoxide gas mixture is not significant and does not appreciably lessen the value of the phosphine-free carbon monoxide gas as a fuel. Since only small concentrations of phosphine are normally present in the carbon monoxide gas mixture, the amount of air required in the method of this invention to oxidize the phosphine to phosphorus pentoxide is correspondingly small and the amount of nitrogen introduced into the carbon monoxide gas mixture is typically less than 10% by volume.

The addition of other diluent, non-flammable gases will generally not affect the method of this invention, except to reduce the fuel energy value of the phosphine-free carbon monoxide gas.

The carbon monoxide gas mixture treated according to the method of this invention is preheated to a temperature of about 500° C. prior to its being reacted with the requisite oxygen or air. If desired, the carbon monoxide gas mixture may be preheated to a temperature in excess of 500° C., up to about 600° C. Gas preheat temperatures above 600° C. are feasible but increase the likelihood that the phosphine may decompose to red phosphorus.

Preheating of the carbon monoxide gas mixture may be achieved by burning a portion of phosphine-free carbon monoxide gas obtained from the method of this invention. The necessary heat transfer may be obtained either by directly mixing the combustion products with the phosphine-containing carbon monoxide gas mixture or by utilizing heat exchangers to raise the temperature of the gas mixture. The former preheating technique is preferred because direct mixing of the cleaned CO gas combustion products with the carbon monoxide gas mixture yields good heat transfer efficiency and the diluent effect of the combustion gases lessens the risk of an explosive CO—$O_2$ mixture inadvertantly being formed in the reactor.

The oxygen or air that is reacted with the phosphine in the carbon monoxide gas mixture may optionally be preheated in the same manner as the gas mixture. However, the small quantity of oxygen or air mixed with the carbon monoxide gas mixture normally makes this procedure unnecessary.

The object of the preheating step is simply to assure that during the mixing of the oxygen or air with the carbon monoxide gas mixture, the gas mixture temperature is initially about 500° C., within the preferred 500° to 600° C. reaction temperature range. If the carbon monoxide gas mixture should initially be below 500° C. upon addition of the oxygen or air and thereafter be heated to the reaction temperature, there is a chance that red phosphorus may form as an unwanted reaction product as the gas mixture is being heated from below 500° C. to the desired reaction temperature.

Certain reactor designs which facilitate rapid heating of the gas mixture, however, may obviate the need for preheating of the carbon monoxide gas mixture prior to mixing with the oxygen or air. The preheating step is specified only to assure that the phosphine in the gas mixture oxidizes cleanly to the phosphorus pentoxide reaction product without the formation of significant amounts of undesirable red phosphorus as a by-product.

The reaction temperature must be between 500° C. to 800° C. during the reaction of the phosphine in the carbon monoxide gas mixture with oxygen or air, so as to assure the formation of phosphorus pentoxide as the reaction product.

Reaction temperatures between 500° C. to 600° C. are preferred, since concurrent oxidation of carbon monoxide to carbon dioxide is minimized at these temperatures and less fuel (heat) is required to maintain the gas mixture at these reaction temperatures, thereby conserving this resource.

Reaction temperatures above 800° C. should be avoided since the reaction of phosphine to phosphorus pentoxide is likely to be accompanied by the simultaneous (and undesirable) oxidation of the carbon monoxide to carbon dioxide. At reaction temperatures below about 500° C., there is a high likelihood that red phosphorus will be formed as a phosphine oxidation product, with or without the concurrent formation of phosphorus pentoxide. The nature of the reactor surface, phosphine/oxygen reactant ratio and overall reactor design are factors that affect the exact temperature below which formation of the undesirable red phosphorus reaction product begins to occur.

Red phosphorus is considered undesirable as a reaction product because recovery of its deposits in the reactor and lines poses process difficulties and because red phosphorus is not readily recoverable as a useful end product. Red phosphorus must either be oxidized to a phosphate with peroxide or other oxidizing agent or recycled to the phosphorus electric furnace to be redistilled as elemental phosphorus. Phosphorus pentoxide, on the other hand, may be recovered as phosphoric acid, merely by scrubbing the entrained phosphorus pentoxide from the gas mixture with an aqueous solution, preferably water or phosphoric acid.

The preferred heat source for achieving the desired reaction temperatures is the phosphine-free carbon monoxide gas produced by the method of this invention. Only a small portion of the clean carbon monoxide gas mixture is normally required to be recycled and burned with stoichiometric air to provide the necessary heat input for maintaining the desired temperature in the reaction zone.

The quantity of oxygen or air introduced into the carbon monoxide feed gas mixture must be sufficient to completely oxidize the phosphine content of the gas mixture to phosphorus pentoxide. Minimally this quantity of oxygen is the amount required for stoichiometric reaction with the phosphine contained in the gas mixture. The preferred quantity of oxygen or air is that amount which provides twice the stoichiometric amount of oxygen required to convert the phosphine to phosphorus pentoxide. The preferred excess of oxygen beyond stoichiometric will ensure that trace amounts of elemental phosphorus ($P_4$), if any, in the carbon monoxide gas mixture will also be oxidized, along with the phosphine, to phosphorus pentoxide in the method of this invention.

Amounts of oxygen or air in excess of twice the stoichiometric quantity needed to react the phosphine to phosphorus pentoxide are unnecessary. Moreover, additional amounts of oxygen or air beyond the preferred quantity (twice the stoichiometric quantity for completely oxidizing phosphine) are undesirable since the potential for forming explosive mixtures of oxygen and carbon monoxide and/or oxygen and phosphine are substantially increased. Such excesses of oxygen may also, in some circumstances, promote the unwanted oxidation of carbon monoxide to carbon dioxide or of hydrogen to water.

Phosphine is reacted to phosphorus pentoxide by the following reaction scheme:

$$2PH_3 + 4O_2 \rightarrow P_2O_5 + 3H_2O$$

Thus, two moles (or volumes) of oxygen are required for stoichiometric reaction with each mole (or volume) of phosphine.

There is some speculation that the reaction product of phosphine with oxygen may in fact be $HPO_3$ rather than phosphorus pentoxide, formed according to the reaction:

$$PH_3 + 2O_2 \rightarrow HPO_3 + H_2O$$

As with the oxidation reaction noted above which forms phosphorus pentoxide, two moles (or volumes) of oxygen are required for stoichiometric reaction with each mole (or volume) of phosphine. The definition of the reaction product in the method of this invention as being phosphorus pentoxide ($P_2O_5$) is therefore intended to encompass the possibility of forming $HPO_3$ as a reaction product as well, since the stoichiometric oxygen/phosphine ratio is identical for both reactions.

When contacted with water, phosphorus pentoxide and $HPO_3$ form phosphoric acid according to the reactions:

$$P_2O_5 + 3H_2O \rightarrow 2H_3PO_4$$

$HPO_3 + H_2O \rightarrow H_3PO_4$

Reaction of the oxygen with the phosphine contained in the gas mixture in the method of this invention is rapid, and reaction times required for complete oxidation of the phosphine to phosphorus pentoxide are accordingly very short.

In any event, the reaction time should be sufficient to allow the phosphine present in the carbon monoxide gas mixture to react completely with the oxygen to form phosphorus pentoxide under the process conditions of this invention. The reaction time or residence time in the reaction zone is defined as the period during which the gas mixture, containing the required amount of oxygen or air, is maintained at the reaction temperature of from 500° C. to 800° C.

Depending on the type and design of the reactor, as well as the ratio of the phosphine (in the feed gas mixture) to oxygen or air employed (whether stoichiometric oxygen or an excess is provided), the reaction may be completed in a period of time as short as one second. Suitable residence times in the reaction zone of the reactor used to carry out the method of this invention are on the order of seconds, usually being from a few seconds up to 30 seconds. The rapid oxidation of the phosphine and the use of short reaction zone residence times help avoid the concurrent oxidation of carbon monoxide to carbon dioxide and the oxidation of hydrogen to water, especially when the preferred excess of oxygen is employed. Complete reaction of 1% by volume phosphine in a feed gas mixture has been achieved in laboratory pipe reactors which had a residence time of about one second and provided an available reactor surface area of 70 cm$^2$/liter of gas flow/minute, using stoichiometric oxygen to oxidize the phosphine.

The reaction in the method of this invention is preferably performed at atmospheric pressure. However, reaction pressure is not a critical parameter in this method.

The reaction of the carbon monoxide gas mixture with oxygen or air may be carried out in conventional reactors which are suitable for gas phase, high temperature reactions. The reaction is preferably carried out in a pipe reactor, which facilitates the rapid reaction of oxygen and phosphine in a relatively short residence time.

The reaction between the phosphine and oxygen appears to be affected by the nature of the reactor surface, possibly because the reaction may occur on the reactor surfaces. Certain reactor surface materials, e.g., austenitic stainless steel, have been found which apparently facilitate the rapid reaction of the phosphine and oxygen and promote the formation of phosphorus pentoxide over red phosphorus at transitional reaction temperatures, i.e., at and slightly below about 500° C. For this reason, ferrous alloys such as stainless steel, especially austenitic stainless steels, are preferred over glass as a material of construction for the reactor surfaces.

The reaction product formed from the oxidation of phosphine, phosphorus pentoxide, typically appears as a whitish-appearing particulate solid which is entrained in the carbon monoxide gas mixture. Conventional techniques used to separate particulate materials from gas streams may be employed to separate the phosphorus pentoxide reaction product from the phosphine-free carbon monoxide gas mixture after completion of the reaction. Scrubbers, electrostatic precipitators, and cyclones are exemplary of such gas-solid separatory equipment which may be used for this purpose.

Preferably, the phosphorus pentoxide reaction product is separated from the gas mixture by scrubbing the gas mixture in conventional scrubbing apparatus with an aqueous solution to form a phosphoric acid solution. Preferred scrubbing solutions are water or dilute phosphoric acid.

The phosphoric acid scrubbing liquor which results after removal of the entrained phosphorus pentoxide reaction product from the phosphine-free gas mixture may be used in most applications normally found for furnace grade phosphoric acid, e.g., as fertilizer in agricultural applications, in metal treating, for its acid values, and the like.

The flow diagram in the FIGURE illustrates a preferred commercial-scale embodiment of the method of this invention. An incoming feed stream of a carbon monoxide gas mixture containing phosphine in small amounts, is first preheated to a temperature of about 500° C. in a preheater, shown in Block A. Heat in the preheating step is supplied by burning phosphine-free carbon monoxide with stoichiometric air in a burner, shown in Block F, the carbon monoxide fuel being a recycled portion of the cleaned carbon monoxide gas mixture produced in this method.

The preheated carbon monoxide gas mixture is then fed to a reactor, shown in Block B, where it is mixed with sufficient air to provide twice the stoichiometric amount of oxygen, based on the amount required to oxidize the phosphine content of the carbon monoxide gas mixture completely to phosphorus pentoxide. The reaction temperature in the reactor is maintained at 500°-600° C. via burning a recycled portion of phosphine-free carbon monoxide with stoichiometric air to provide the necessary heat, shown in Block F.

The carbon monoxide gas mixture exiting from the reactor is scrubbed with water, as shown in Block C, to remove the entrained phosphorus pentoxide as a phosphoric acid solution. Residual particulate phosphorus pentoxide in the scrubbed gas mixture is removed in a precipitator, in Block D, whose recovered solids are added to the scrubber liquor from Block C. A demister, shown in Block E, removes phosphoric acid droplets entrained in the gas mixture after the precipitator treatment, and the recovered phosphoric acid is added to the phosphoric acid solution from the previous scrubber and precipitator operations.

The phosphine-free carbon monoxide gas stream obtained from the method of this invention may then be used as a phosphine-free fuel, wherever such an energy source may have application. It should be noted that less than 10%, typically 5%, of the cleaned carbon monoxide gas stream would have to be recycled and burned to provide the necessary energy for heating the feed gas streams and maintaining the desired reaction temperatures in the preferred embodiment described above.

EXAMPLES

The principles, features and advantages of this invention may be further understood by consideration of the following specific examples. The examples are intended to be illustrative of the method of this invention and should not be construed to limit the scope of the claimed invention.

The examples were performed in a laboratory-scale pipe reactor which was heated by an electrical resistance tube furnace. Except where noted otherwise, the pipe reactor consisted of a quartz glass tube, having an inside diameter of 0.90–0.95 cm and being approximately 30 cm in length. The desired reaction temperature was obtained over a 20 cm portion of tube length and gas passing through this portion of the tube was maintained at the reaction temperature. This 20 cm portion of the pipe reactor tube length was used as the effective pipe reactor length in calculations of residence time for gas passing through the tube reactor and being maintained at the desired reaction temperature.

The gas mixture, having a compositional analysis as noted in the Table, was fed into the pipe reactor at a flow rate of about 837 ml/minute, which was sufficient to provide a residence time of about 1.0 second in the pipe reactor's 20 cm effective length. In these experiments, the gas mixture was approximately at ambient temperature and not preheated to a temperature of 500° C. before being mixed with air and being fed to the pipe reactor.

The gas mixture and reaction products exiting from the pipe reactor were passed through a system of traps designed to collect the solid reaction products (red P and/or $P_2O_5$) and a sample of the exiting gas for analysis. The gas mixture flowed sequentially through two 125 ml Ehrlenmeyer flask traps containing glass wool and connected in series, a 250 ml gas collection sample tube, and a final trap containing sulfuric acid to scrub the exiting gas of any residual unreacted phosphine.

In each experiment, the gas mixture was allowed to pass through the pipe reactor for ten minutes before the exiting gas was sampled for subsequent analysis by gas chromatography. The particulate reaction product appeared as a reddish (red P) or white ($P_2O_5$) cloud flowing through the system, which tended to deposit on the glass wool in the traps and in the glass connective tubing.

Comparative Runs A, B and C

Comparative Runs A and B illustrate the formation of red phosphorus as a reaction product when phosphine-containing gases are oxidized with oxygen at temperatures below 500° C. Examples A and B used $O_2:PH_3$ molar ratios of approximately 2:1 and 4:1, respectively, which corresponded to exactly and twice the stoichiometric amount of oxygen required to react completely with phosphine to form phosphorus pentoxide.

Comparative Runs A and B were performed at reaction temperatures of 400° C. and 470° C., respectively, and resulted in 72% and 100% oxidation of the incoming phosphine in the feed gas, in the form of red phosphorus as the reaction product.

Comparative Run C was performed at a temperature of 500° C. with a 2:1 $O_2:PH_3$ molar ratio, which provided exactly the stoichiometric amount of oxygen required for the phosphine to react completely to form phosphorus pentoxide. The reaction product was a mixture of red phosphorus and $P_2O_5$, which indicates that this particular combination of parameters (reaction temperature, residence time and $O_2:PH_3$ molar ratio) was unsatisfactory for providing 100% phosphorus pentoxide as the reaction product.

Data for Comparative Runs A, B and C are summarized in the Table.

Inventive Runs 1, 2, 3 and 4

Inventive Runs 1, 2 and 3 illustrate the method of this invention operated at reaction temperatures of 500° C., 600° C. and 800° C., respectively. All three Runs used an $O_2:PH_3$ molar ratio of 4:1, which provided twice the stoichiometric amount of oxygen required for complete oxidation of the phosphine to phosphorus pentoxide. In all three Runs, 100% oxidation of the phosphine was achieved, with the reaction product being exclusively phosphorus pentoxide.

Inventive Run 4 illustrates the low reactivity of carbon monoxide (CO) at a temperature of 800° C. Only 0.5% of the CO in the feed gas mixture, which contained 85% CO, oxidized to carbon dioxide ($CO_2$) when an amount of oxygen equivalent to that used in Inventive Runs 1 to 3 was present in the feed gas mixture. Consequently, complete reaction of the phosphine in carbon monoxide gas mixtures may be expected, with minimal co-oxidation of the CO to $CO_2$ taking place, under the reaction temperature range and other reaction conditions specified for the method of this invention.

Data for Inventive Runs 1, 2, 3 and 4 are summarized in the Table.

Comparative Run D and Inventive Run 5

Comparative Run D and Inventive Run 5 illustrate the effect of reaction surface on the reaction product and degree of oxidation obtained in the method of this invention. Comparative Run D and Inventive Run 5 were performed in an austenitic stainless steel tube reactor, having an inside diameter of 0.90 cm and overall length of 30 cm. Its effective length, over which the temperature was maintained at the desired reaction temperature, was 20 cm. The total flow rate of gas through the reactor was 838 ml/min, thus providing a residence time in the 20 cm effective tube length of approximately 1 second. In all other aspects the stainless steel pipe reactor and the quartz glass pipe reactor used in previous runs were equivalent.

Comparative Run D was performed under reaction conditions which substantially duplicated those used in Comparative Run A. While Comparative Run A in the glass pipe reactor resulted in only 72% of the phosphine being oxidized at a reaction temperature of 400° C., Comparative Run D yielded 99% oxidation of the phosphine at the same temperature by using a stainless steel pipe reactor under otherwise identical reaction conditions. Furthermore, the reaction product of Comparative Run D was a mixture of red phosphorus and phosphorus pentoxide, in contrast to the exclusively red phosphorus reaction product of Comparative Run A.

Inventive Run 5 was performed under reaction conditions which duplicated those of Comparative Run C, except that the stainless steel pipe reactor was substituted for the glass pipe reactor used in Comparative Run C. In Comparative Run C only 65% of the phosphine was oxidized at the reaction temperature of 500° C., but 100% of the phosphine was oxidized in Inventive Run 5.

Not only was the degree of oxidation different, but also the oxidation reaction products were different between Inventive Run 5 and Comparative Run C. In contrast to the mixture of red phosphorus and phosphorus pentoxide obtained in Comparative Run C, Inventive Run 5 produced phosphorus pentoxide alone as the reaction product.

It is interesting to note that the mixed reaction product (red P/$P_2O_5$) obtained in Comparative Run C was avoided in Inventive Run 1 through an increase in the $O_2:PH_3$ molar ratio from 2:1 to the preferred 4:1. Both of these runs were performed in glass pipe reactors at otherwise identical reaction conditions.

In Inventive Run 5, the effect of the stainless steel pipe reactor surface appeared to obviate the need to increase the $O_2:PH_3$ molar ratio to avoid formation of a mixed (red $P/P_2O_5$) reaction product that would otherwise be formed under the reaction conditions of Comparative Run C (in a glass pipe reactor).

TABLE

| Run | Feed Gas (% by Volume) PH₃ | O₂ | CO | N₂ | Reaction Temperature (°C.) | Residence Time (Sec.) | Reaction Product | % PH₃ Oxidized | Reactor Surface | Comments |
|---|---|---|---|---|---|---|---|---|---|---|
| A | 0.8 | 1.5 | 0 | 98 | 400 | 1.0 | Red P | .72 | Glass | |
| B | 0.7 | 3.1 | 15 | 81 | 470 | 1.0 | Red P | 100 | Glass | 0.6% CO Oxidized |
| C | 0.8 | 1.5 | 0 | 98 | 500 | 1.0 | Red P & $P_2O_5$ | 65 | Glass | |
| 1 | 0.7 | 3.1 | 0 | 96 | 500 | 1.0 | $P_2O_5$ | 100 | Glass | |
| 2 | 0.7 | 3.1 | 0 | 96 | 600 | 1.0 | $P_2O_5$ | 100 | Glass | |
| 3 | 0.7 | 3.1 | 0 | 96 | 800 | 1.0 | $P_2O_5$ | 100 | Glass | |
| 4 | 0 | 3.2 | 85 | 11.7 | 800 | 1.0 | — | — | Glass | 0.5% CO Oxidized |
| D | 0.8 | 1.5 | 0 | 98 | 400 | 1.0 | Red P & $P_2O_5$ | 99 | Stainless Steel | |
| 5 | 0.8 | 1.5 | 0 | 98 | 500 | 1.0 | $P_2O_5$ | 100 | Stainless Steel | |

We claim:

1. A method for preferentially removing phosphine from off-gas generated in the electric furnace production of elemental phosphorus, which off-gas is a gas mixture essentially free of elemental phosphorus and containing at least 85% by volume carbon monoxide and containing phosphine in an amount less than 1% by volume which comprises:
   (a) preheating the carbon monoxide gas mixture to a temperature of about 500° C.;
   (b) introducing an amount of oxygen into the gas mixture sufficient to oxidize the phosphine to phosphorus pentoxide;
   (c) maintaining the gas mixture in a reaction zone at a temperature of from about 500° C. to about 800° C. for a period of time sufficient to oxidize the phosphine to phosphorus pentoxide without substantial concurrent oxidation of the carbon monoxide; and
   (d) recovering the entrained phosphorus pentoxide reaction product from the gas mixture.

2. The method of claim 1 wherein the gas mixture contains from about 90 to 92% by volume carbon monoxide and less than 0.3% by volume phosphine.

3. The method of claim 1 which further comprises preheating the oxygen introduced into the carbon monoxide gas mixture to a temperature of about 500° C.

4. The method of claim 1 wherein the gas mixture is maintained in the reaction zone at a temperature between 500° to 600° C.

5. The method of claim 1 wherein the gas mixture is maintained in the reaction zone for at least one second up to 30 seconds.

6. The method of claim 1 wherein the reaction zone is bounded by a surface formed of austenitic stainless steel.

7. The method of claim 1 wherein the phosphorus pentoxide is recovered by scrubbing the gas mixture with an aqueous solution selected from the group consisting of water and phosphoric acid.

8. The method of claim 1 wherein the oxygen is supplied as air having the requisite oxygen content.

9. The method of claims 1 or 8 wherein the amount of oxygen introduced into the carbon monoxide gas mixture is up to twice the stoichiometric amount of oxygen required to oxidize the phosphine to phosphorus pentoxide.

10. The method of claim 1 which further comprises burning a portion of the phosphine-free carbon monoxide gas mixture, produced according to the method of claim 1, with stoichiometric air to provide the heat necessary for preheating the gas mixture in step (a).

11. The method of claim 1 or 10 which further comprises burning a portion of the phosphine-free carbon monoxide gas mixture, produced according to the method of claim 1, with stoichiometric air to provide the heat necessary for maintaining the gas mixture at the desired reaction temperature.

* * * * *